(12) United States Patent
Scheele et al.

(10) Patent No.: US 11,588,242 B2
(45) Date of Patent: Feb. 21, 2023

(54) AUTOMOBILE ANTENNA ASSEMBLY WITH INTEGRATED PHOTO RADIATION INTENSITY SENSOR

(71) Applicant: Littelfuse, Inc., Chicago, IL (US)

(72) Inventors: Juergen Scheele, Bremen (DE); Darius Belazaras, Kaunas (LT); Mindaugas Ketlerius, Kaunas (LT)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 17/735,232

(22) Filed: May 3, 2022

(65) Prior Publication Data

US 2022/0263241 A1   Aug. 18, 2022

Related U.S. Application Data

(63) Continuation of application No. 16/634,659, filed as application No. PCT/US2018/045208 on Aug. 3, 2018, now Pat. No. 11,437,720.

(60) Provisional application No. 62/540,684, filed on Aug. 3, 2017.

(51) Int. Cl.
| | |
|---|---|
| *H01Q 1/32* | (2006.01) |
| *H01Q 5/22* | (2015.01) |
| *G01J 1/02* | (2006.01) |
| *G01J 1/04* | (2006.01) |
| *G01J 1/42* | (2006.01) |
| *H01Q 1/42* | (2006.01) |
| *H01Q 1/12* | (2006.01) |

(52) U.S. Cl.
CPC .............. *H01Q 5/22* (2015.01); *G01J 1/0271* (2013.01); *G01J 1/0403* (2013.01); *G01J 1/0488* (2013.01); *G01J 1/42* (2013.01); *H01Q 1/3275* (2013.01); *H01Q 1/42* (2013.01); *G01J 2001/4266* (2013.01); *H01Q 1/1271* (2013.01)

(58) Field of Classification Search
CPC .......... H01Q 5/22; H01Q 1/3275; H01Q 1/42; H01Q 1/1271; G01J 1/0271; G01J 1/0403; G01J 1/0488; G01J 1/42
See application file for complete search history.

(56) References Cited

FOREIGN PATENT DOCUMENTS

| | | | | |
|---|---|---|---|---|
| KR | 20060055042 | * | 5/2006 | ............... H01Q 1/32 |
| KR | 20060055042 A | | 5/2006 | |

* cited by examiner

*Primary Examiner* — Joseph J Lauture
(74) *Attorney, Agent, or Firm* — KDB Firm PLLC

(57) ABSTRACT

An automobile antenna assembly including a housing adapted for installation on a roof of an automobile, the housing having a base portion and a fin portion extending from the base portion, a radio antenna disposed within the fin portion, and a photo radiation intensity sensor disposed within the base portion, the photo radiation intensity sensor including a first light detecting element located on a first side of the fin portion and a second light detecting element located on a second side of the fin portion opposite the first side, wherein at least a portion of the base portion is translucent for allowing light to be received by the first and second light detecting elements, the fin portion providing a light barrier between the first light detecting element and the second light detecting element.

17 Claims, 5 Drawing Sheets

AUTOMOBILE ANTENNA ASSEMBLY WITH INTEGRATED PHOTO RADIATION INTENSITY SENSOR

CROSS-REFERENCES TO RELATED APPLICATIONS

This application is a Continuation of and claims the benefit of U.S. Non-Provisional patent application Ser. No. 16/634,659, filed Jan. 28, 2020, which is a 371 of PCT/US2018/045208, filed Aug. 3, 2018, which claims the benefit of U.S. Provisional Patent Application No. 62/540,684, filed Aug. 3, 2017, all of which applications are incorporated by reference herein in their entireties.

FIELD OF THE DISCLOSURE

The disclosure relates generally to the field of sensors, and more particularly to photo radiation intensity sensors for automobiles.

BACKGROUND OF THE DISCLOSURE

Modern automobiles are commonly equipped with photo radiation intensity sensors that are provided for measuring the intensity of solar radiation cast on an automobile. The measured solar radiation intensity can be used to automatically control the function of an automobile's climate control system, for example. Conventional photo radiation intensity sensors typically employ light detecting elements (e.g., photodiodes) disposed adjacent an interior surface of an automobile's windshield, where solar radiation entering the windshield may be received. For example, photo radiation intensity sensors are conventionally located on an automobile's dashboard or within a rearview mirror housing of an automobile.

There are a number of disadvantages associated with conventionally-located photo radiation intensity sensors. For example, significant amounts of solar radiation cast on the sides, rear, and/or top of an automobile may be occluded by the body of the automobile and prevented from being received by a photo radiation intensity sensor located on a dashboard or within a rearview mirror housing. This may result in an inaccurate measurement of solar radiation entering an automobile's cabin, which may in-turn result in inappropriate manipulation of an automobile's climate control system. Furthermore, the amount of space available on an automobile's dashboard and in an automobile's rearview mirror housing is limited, which may give rise to complex design considerations with regard to the size, configuration, and aesthetic appearance of photo radiation intensity sensors. Still further, since different automobiles have different windshields that allow different amounts of solar radiation to pass therethrough, the climate control system of an automobile must be specifically calibrated to complement a particular type of windshield used in an automobile. Such calibration adds to the time and cost associated with manufacturing the automobile.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of an automobile antenna assembly in accordance with the present disclosure may include a housing adapted for installation on a roof of an automobile, a radio antenna disposed within the housing, and a photo radiation intensity sensor disposed within the housing.

Another exemplary embodiment of an automobile antenna assembly in accordance with the present disclosure may include a housing adapted for installation on a roof of an automobile, the housing having a base portion and a fin portion extending from the base portion, a radio antenna disposed within the fin portion, and a photo radiation intensity sensor disposed within the base portion, the photo radiation intensity sensor including a first light detecting element located on a first side of the fin portion and a second light detecting element located on a second side of the fin portion opposite the first side, wherein at least a portion of the base portion is translucent for allowing light to be received by the first and second light detecting elements, the fin portion providing a light barrier between the first light detecting element and the second light detecting element

DETAILED DESCRIPTION

An automobile antenna assembly in accordance with the present disclosure will now be described more fully hereinafter with reference to the accompanying drawings, in which preferred embodiments of the automobile antenna assembly are presented. The automobile antenna assembly of the present disclosure may, however, be embodied in many different forms and should not be construed as being limited to the embodiments set forth herein. Rather, these embodiments are provided so that this disclosure will convey certain exemplary aspects of the present disclosure to those skilled in the art.

Figure 1:
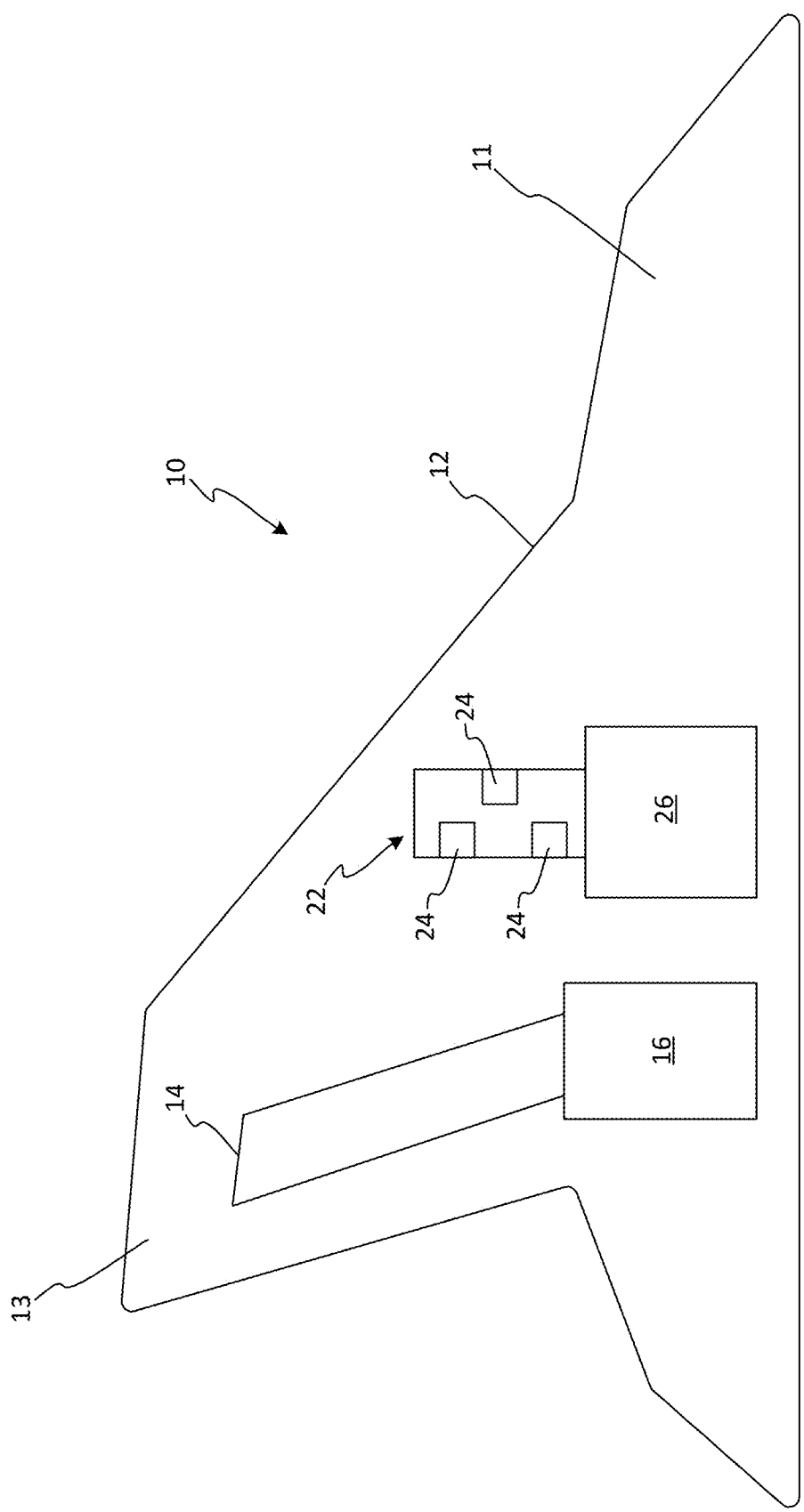
FIG. 1 is a schematic side view illustrating an exemplary embodiment of an automobile antenna assembly with an integrated photo radiation intensity sensor in accordance with the present disclosure.
Figure 2:
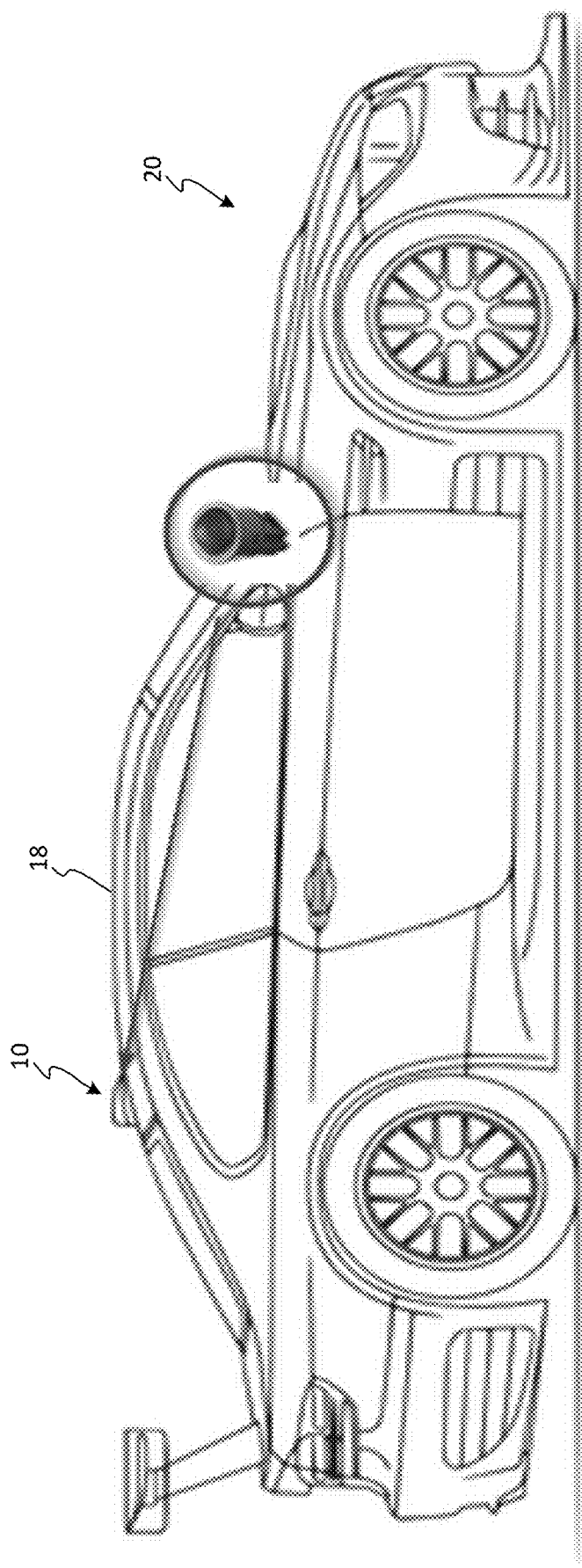
FIG. 2 is a schematic side view illustrating the automobile antenna assembly shown in FIG. 1 mounted on an automobile.

Referring to FIG. 1, a schematic side view illustrating an automobile antenna assembly 10 (hereinafter "the assembly 10") in accordance with an exemplary embodiment of the present disclosure is shown. In the depicted, non-limiting embodiment, the assembly 10 may be substantially similar to "shark fin" type automobile radio antennas that will be recognized by those of ordinary skill in the art. Particularly, the assembly 10 may include a housing 12 having a base portion 11 and a fin-shaped portion 13 (hereinafter "the fin portion 13) that contain a radio antenna 14 and associated circuitry 16 for facilitating an automobile's radio functionality (e.g., AM/FM radio, satellite radio, HD radio, etc.). The assembly 10 may be adapted for installation on the roof 18 of an automobile 20 as depicted in FIG. 2. The present disclosure is not limited in this regard.

Referring back to FIG. 1, the assembly 10 may further include a photo radiation intensity sensor 22 (hereinafter "the sensor 22") disposed within the housing 12. The sensor 22 may include one or more light detecting elements 24 (e.g., photodiodes) that are adapted to receive photo radiation (e.g., solar radiation) cast on the assembly 10 and to generate an electrical output signal that corresponds to an intensity of the received photo radiation. The light detecting elements 24 may include associated circuitry 26 that may be disposed within the housing 12. In various alternative embodiments, the circuitry 26 may be located remote from the assembly 10, elsewhere within an automobile. The light detecting elements 24 and the associated circuitry 26 may be adapted for operative connection to an automobile's CPU and/or climate control system (not shown), whereby an intensity of photo radiation measured by the light detecting elements 24 and the associated circuitry 26 may be used to facilitate certain functionality of the climate control system (e.g., to automatically increase cooling within the cabin of an automobile to maintain a desired cabin temperature).

Unlike conventional shark fin-type automobile radio antennas, the housing 12 of the assembly 10 may be formed of a material that is translucent for allowing solar radiation to pass through the housing 12 and to be received by the light detecting elements 24 of the sensor 22. For example, the housing 12 may be formed of a plastic that is transparent or translucent with respect to infrared light (i.e., light having a wavelength in the range of 700 nm to 1 mm), but that is substantially opaque with respect to visible light (i.e., light having a wavelength in the range of 400 nm to 700 nm). Thus, the housing 12 may have the outward appearance of a conventional shark fin-type antenna while allowing solar radiation to be received by the light detecting elements 24. Of course, the housing 12 should not be painted or otherwise coated in a manner that would prevent photo radiation (e.g., infrared light) from passing therethrough.

The light detecting elements 24 of the sensor 22 may be arranged in a manner that provides substantially 360 degree horizontal coverage and substantially 180 degree vertical coverage with respect to incoming photo radiation. That is, the light detecting elements 24 of the sensor 22 may be configured to receive solar radiation that is cast on the front, rear, sides, and top of an automobile in which the assembly 10 is implemented. This hemispherical coverage is facilitated by the number and arrangement of the light detecting elements 24, as well as by the location of the assembly 10 on the roof of an automobile. While the sensor 22 is depicted in FIG. 1 as including three light detecting elements 24, it is contemplated that the sensor 22 may include a greater or fewer number of light detecting elements 24 without departing from the scope of the present disclosure.

It will be appreciated that the assembly 10 of the present disclosure provides numerous advantages relative to traditional dashboard-mounted and rearview mirror-mounted photo radiation intensity sensors. For example, solar radiation that is cast on the sides, rear, and top of an automobile can be received by the light detecting elements 24 of the assembly 10, thus facilitating measurement of solar radiation entering an automobile's cabin with greater accuracy relative to conventional automobile photo radiation intensity sensors. Additionally, since the assembly 10 is installed on the roof of an automobile, the amount of space available on the automobile's dashboard and in the automobile's rearview mirror housing need not be taken into consideration when implementing the assembly 10. Still further, since photo radiation that is received by the light detecting elements 24 of the assembly 10 does not pass through the windshield of an automobile in which the assembly 10 is implemented, the climate control system of the automobile need not be specifically calibrated to complement the particular type of windshield used in the automobile. Rather, all climate control systems may be calibrated for use with the assembly 10 without regard for the type of automobile in which the assembly 10 is implemented or the type of windshield used in an automobile.

Figure 3:
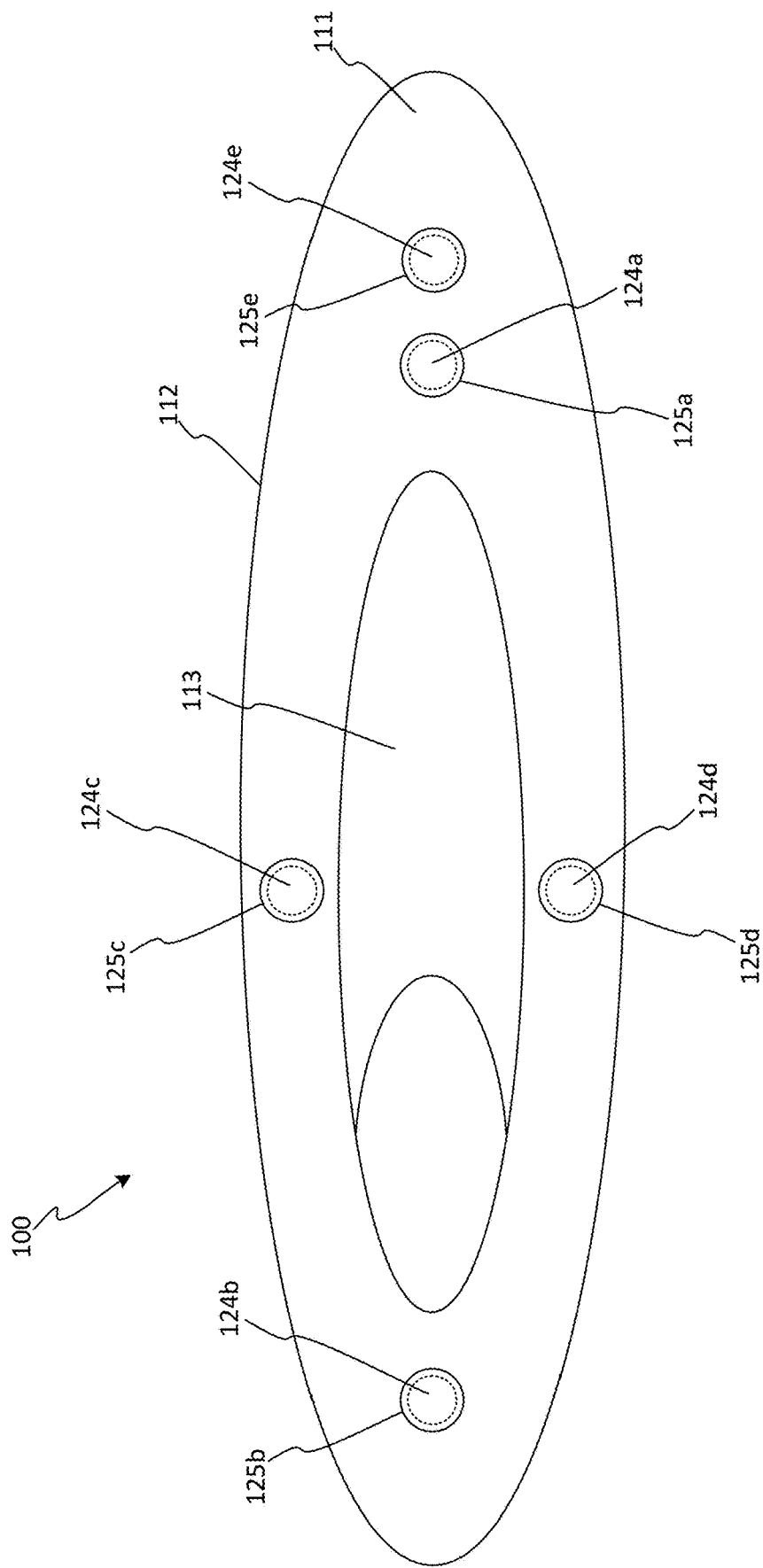
FIG. 3 is a schematic top view illustrating another exemplary embodiment of an automobile antenna assembly with an integrated photo radiation intensity sensor in accordance with the present disclosure.

In various embodiments, an automobile antenna assembly in accordance with the present disclosure may include light detecting elements that are strategically positioned to facilitate determination of the direction incoming photo radiation. For example, referring to FIG. 3, a schematic top view illustrating an automobile antenna assembly 100 (hereinafter "the assembly 100") in accordance with an exemplary embodiment of the present disclosure is shown. The assembly 100 may be substantially similar to the assembly 10 described above and may include a housing 112 having a base portion 111 and a fin portion 113 that contain a radio antenna and associated circuitry (now shown) for facilitating an automobile's radio functionality (e.g., AM/FM radio, satellite radio, HD radio, etc.). The assembly 100 may be adapted for installation on the roof of an automobile in the same manner as the assembly 10 shown in FIG. 2.

The assembly 100 may further include one or more photo radiation intensity sensors that may include a plurality of light detecting elements (e.g., photodiodes) located in or on the base portion 111 that are adapted to receive photo radiation (e.g., solar radiation) cast on the assembly 100 and to generate electrical output signals that correspond to intensities of the received photo radiation. For example, the assembly 100 may include a front light detecting element 124 in the base portion 111 positioned in front of the fin portion 113, a rear light detecting element 124b in the base portion 111 positioned behind the fin portion 113, a left-side light detecting element 124c in the base portion 111 positioned to the left of the fin portion 113, and a right-side light detecting element 124d in the base portion 111 positioned to the right of the fin portion 113. In some embodiments, the assembly 100 may further include an ambient light detecting element 124e. The ambient light detecting element 124e is shown as being located in front of the fin portion 113, but this is not critical, and it is contemplated that the ambient light detecting element 124e can alternatively be located elsewhere in/on the base portion 111 or in/on the fin portion 113.

The light detecting elements 124*a-e* may include associated circuitry (not shown) that may be disposed within the housing 112 or that may be located remote from the assembly 100, elsewhere within an automobile. The light detecting elements 124*a-d* and the associated circuitry may be adapted for operative connection to an automobile's CPU and/or climate control system (not shown), whereby intensities of photo radiation measured by the light detecting elements 124*a-d* and associated circuitry may be used to facilitate certain functionality of the climate control system as further described below. The ambient light detecting element 124e and associated circuitry may be adapted for operative connection to an automobile's CPU and/or lighting control system (not shown), whereby an intensity of photo radiation measured by the ambient light detecting element 124e and associated circuitry may be used to automatically operate the automobile's exterior and interior lights (e.g., headlamps may be activated when the detected intensity of ambient light falls below a predetermined level).

In some embodiments, the light detecting elements 124a-e may be located within/behind respective windows 125a-e in the base portion 111. The windows 125a-e may be areas of the base portion 111 that are translucent for allowing solar radiation to pass through the windows 125a-e and to be received by the light detecting elements 124a-e, whereas other areas of the base portion 111 may be substantially opaque to solar radiation. For example, the windows 125a-e may be formed of a plastic that is transparent or translucent with respect to infrared light (i.e., light having a wavelength in the range of 700 nm to 1 mm), but that is substantially opaque with respect to visible light (i.e., light having a wavelength in the range of 400 nm to 700 nm). In alternative embodiments, it is contemplated that the windows 125a-e may be omitted and that the entire base portion 111, or the entire housing 112, may be transparent or translucent.

The fin portion 113 of the housing 112, which extends vertically upwardly from the base portion 111 in a central position between the light detecting elements 124a-d, may act as a light barrier between the light detecting elements 124a-d. For example, solar radiation incoming from a rear of the assembly 100 may be received by the rear light detecting element 124b, but may be occluded by the fin portion 113 and prevented from being received by the front light detecting element 124a. The fin portion 113 may similarly occlude solar radiation incoming from the front, left, and right sides of the assembly 100 and may prevent such solar radiation from being received by the rear light detecting element 124b, the left-side light detecting element 124c, and the right-side light detecting element 124d, respectively. Thus, since each of the light detecting elements 124a-d generally only receives solar radiation incoming from a respective, corresponding direction (i.e., with solar radiation incoming from other directions being substantially blocked by the fin portion 113), the light detecting elements 124a-d and associated circuitry may generate electrical output signals that accurately represent both the intensity and the direction(s) of incoming solar radiation.

Since the intensity and direction of incoming solar radiation is known, the assembly 100 may facilitate operation of an automobile's climate control system in a targeted manner that maximizes efficiency and passenger comfort. For example, if it is known that solar radiation is primarily incoming from the left of the assembly 100, vents and/or blowers of the automobile's climate control system may be automatically adjusted to provide cool air to the driver's side of the automobile. The driver, as well as the other occupants of the automobile, may therefore be appropriately cooled with respect to the intensity of solar radiation entering the cabin from various directions.

While the assembly 100 has been described above as including a front light detecting element 124a, a rear light detecting element 124b, a left-side light detecting element 124c, and a right-side light detecting element 124d, it is contemplated that a greater or fewer number of light detecting elements may be implemented in the assembly 100 without departing from the present disclosure. For example, it is contemplated that the front and rear light detecting elements 124a, b may be omitted and that the assembly 100 may be implemented with only the left-side and right-side light detecting elements 124c, d. The ambient light detecting element 124e may be included or omitted in any such embodiments.

Figure 4A:
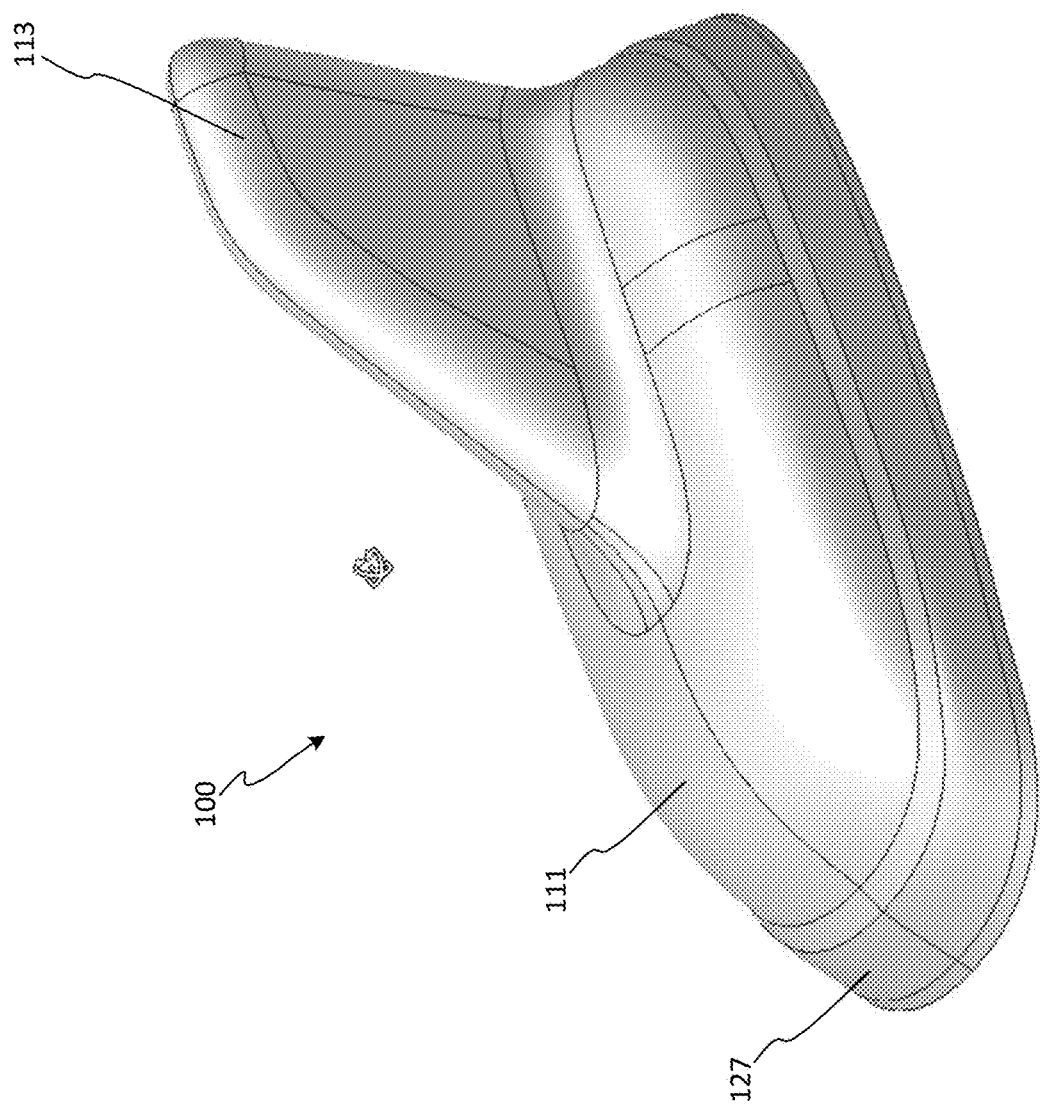
FIG. 4A is a perspective view illustrating another exemplary embodiment of an automobile antenna assembly with an integrated photo radiation intensity sensor in accordance with the present disclosure.
Figure 4B:
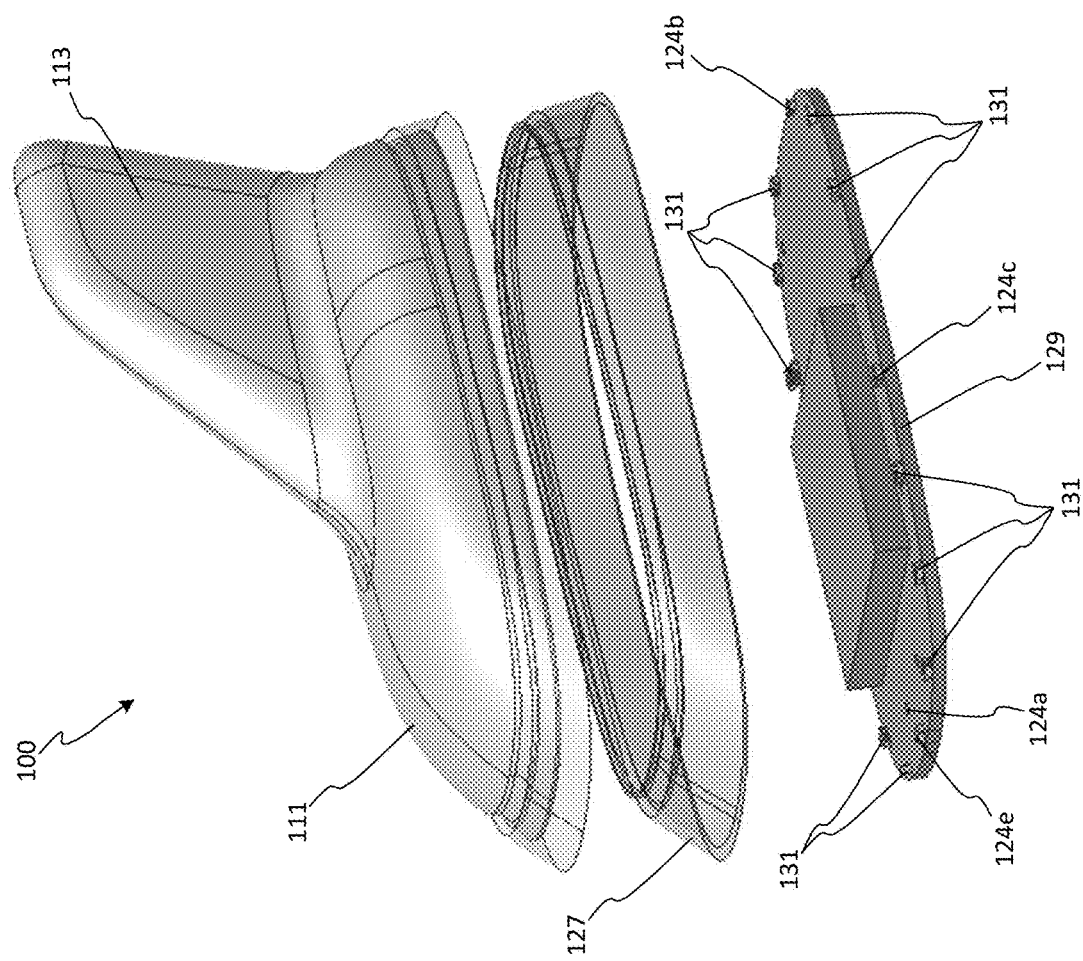
FIG. 4B is an exploded perspective view illustrating the automobile antenna assembly shown in FIG. 4A.

Referring to FIGS. 4A and 4B, a perspective view and an exploded view illustrating an exemplary alternative embodiment of above-described assembly 100 are shown, respectively. In the depicted embodiment, the base portion 111 may include a gasket portion 127 that surrounds the bottom of the base portion 111. The gasket portion 127, which may be provided for sealing the base portion 111 to the roof of an automobile, may be formed of an optically transparent or translucent rubber or plastic, and the light detecting elements 124a-e (light detecting element 124d is not within view in FIG. 4B) may be located behind the gasket portion 127 and may receive photo radiation therethrough. The rest of base portion 111 and the fin portion 113 may be optically opaque (e.g., painted black or painted to match the color of an automobile).

The light detecting elements 124a-e may be disposed on a printed circuit board (PCB) 129 that may be disposed within the gasket portion 127 and that may, in some embodiments, be entirely separate from a radio antenna and associated circuitry that may be housed in the fin portion 113 of the assembly 100, for example. In addition to the light detecting elements 124a-e, the assembly 100 may include a one or more light emitting diodes (LEDs) 131 that may be configured to emit different colors of light through the gasket portion 127 to indicate different statuses of an automobile to which the assembly 100 is connected. For example, the LEDs 131 may flash red light (and may thereby emit flashing red light through the gasket portion 127) when an alarm of an attached automobile is triggered. Additionally or alternatively, if the assembly 100 is attached to an electric vehicle, the LEDs 131 may emit different colors of light to indicate a charging status of the vehicle. For example, the LEDs 131 may emit orange or yellow light when the electric vehicle is in a delayed charge mode and may emit green light when the electric vehicle is in an active charge mode. The present disclose is not limited in this regard, and it is contemplated that the LEDs 131 may be similarly employed to communicate various others types of information to observers.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An automobile antenna assembly comprising:
a housing adapted for installation on a roof of an automobile;
a radio antenna disposed within the housing; and
a photo radiation intensity sensor disposed within the housing;
wherein the housing includes a base portion and a fin portion extending from the base portion, and wherein the photo radiation intensity sensor includes a first light detecting element located on a first side of the fin portion and a second light detecting element located on a second side of the fin portion opposite the first side, the fin portion providing a light barrier between the first light detecting element and the second light detecting element.

2. The automobile antenna assembly of claim 1, wherein at least a portion of the housing is translucent.

3. The automobile antenna assembly of claim 1, wherein at least a portion of the housing is translucent with respect to infrared light and is opaque with respect to visible light.

4. The automobile antenna assembly of claim 1, wherein the photo radiation intensity sensor further includes a third light detecting element located on a third side of the fin portion and a fourth light detecting element located on a fourth side of the fin portion opposite the third side.

5. The automobile antenna assembly of claim 1, wherein the first and second light detecting elements are adapted to receive solar radiation cast on respective sides of the automobile.

6. The automobile antenna assembly of claim 5, wherein the photo radiation intensity sensor further includes an ambient light detecting element.

7. The automobile antenna assembly of claim 1, further comprising a gasket surrounding at least a portion of the base portion, wherein the first and second light detecting elements are located behind the gasket.

8. The automobile antenna assembly of claim 7, wherein the gasket is translucent with respect to visible light.

9. The automobile antenna assembly of claim 8, further including a light emitting diode (LED) disposed within the base portion and adapted to emit light through the gasket to provide an indication of a status of the automobile to observers.

10. The automobile antenna assembly of claim 9, wherein light emitted by the LED indicates a charging status of the automobile.

11. The automobile antenna assembly of claim 10, wherein light emitted by the LED indicates an alarm status of the automobile.

12. An automobile antenna assembly comprising:
a housing adapted for installation on a roof of an automobile, the housing having a base portion and a fin portion extending from the base portion;
a radio antenna disposed within the fin portion; and
a photo radiation intensity sensor disposed within the base portion, the photo radiation intensity sensor including a first light detecting element located on a first side of the fin portion and a second light detecting element located on a second side of the fin portion opposite the first side, wherein at least a portion of the base portion is translucent for allowing light to be received by the first and second light detecting elements;
wherein the fin portion provides a light barrier that prevents light cast on a first side of the automobile from being received by the second light detecting element and prevents light cast on a second side of the automobile from being received by the first light detecting element.

13. The automobile antenna assembly of claim 12, further comprising a gasket surrounding at least a portion of the base portion, wherein the first and second light detecting elements are located behind the gasket.

14. The automobile antenna assembly of claim 13, wherein the gasket is translucent with respect to visible light.

15. The automobile antenna assembly of claim 14, further including a light emitting diode (LED) disposed within the base portion and adapted to emit light through the gasket to provide an indication of a status of the automobile to observers.

16. The automobile antenna assembly of claim 15, wherein light emitted by the LED indicates a charging status of the automobile.

17. The automobile antenna assembly of claim 16, wherein light emitted by the LED indicates an alarm status of the automobile.

* * * * *